(12) United States Patent
Daniel et al.

(10) Patent No.: US 10,764,342 B2
(45) Date of Patent: Sep. 1, 2020

(54) PERFORMING REMOTE INSPECTION AT SUBSEA LOCATIONS

(71) Applicant: Subsea 7 Limited, Sutton (GB)

(72) Inventors: Douglas Daniel, Aberdeen (GB); Keith Grabham, Aberdeen (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 16/334,727

(22) PCT Filed: Sep. 20, 2017

(86) PCT No.: PCT/GB2017/052788
§ 371 (c)(1),
(2) Date: Mar. 19, 2019

(87) PCT Pub. No.: WO2018/055353
PCT Pub. Date: Mar. 29, 2018

(65) Prior Publication Data
US 2019/0268390 A1    Aug. 29, 2019

(30) Foreign Application Priority Data

Sep. 20, 2016 (GB) .................................. 1616019.4

(51) Int. Cl.
*H04L 29/06* (2006.01)
*H04B 7/185* (2006.01)
(Continued)

(52) U.S. Cl.
CPC ..... *H04L 65/4069* (2013.01); *H04B 7/18595* (2013.01); *H04L 43/0882* (2013.01);
(Continued)

(58) Field of Classification Search
CPC ... H04L 65/4069; H04L 69/14; H04L 65/601; H04L 65/1086; H04L 43/0882;
(Continued)

(56) References Cited

U.S. PATENT DOCUMENTS 5,793,813 A    8/1998  Cleave
7,009,550 B2   3/2006  Moeller-Jensen
(Continued)

FOREIGN PATENT DOCUMENTS

EP    0 737 321    5/1996
EP    2 919 182    9/2015
(Continued)

*Primary Examiner* — Eugene Yun
(74) *Attorney, Agent, or Firm* — Levy & Grandinetti (57) ABSTRACT

A method of performing remote subsea inspection includes processing mission data from a UUV at an offshore location to produce a low-resolution output and a high-resolution output, automatically and in real time. The high-resolution output is stored at the offshore location while the low-resolution output is transmitted wirelessly across a low-bandwidth communication also automatically and in real time, to be reviewed by subject-matter experts at one or more onshore or inshore locations. Selected portions of the high-resolution output can be transmitted across the communication link to the subject-matter experts on demand. Data outputs can be transmitted across the communication link at a resolution adjusted automatically in accordance with the bandwidth measured to be available on that link.

26 Claims, 5 Drawing Sheets

(51) Int. Cl.
*H04L 12/26* (2006.01)
*H04Q 9/00* (2006.01)
*H04B 3/60* (2006.01)

(52) U.S. Cl.
CPC ........ *H04L 65/1086* (2013.01); *H04L 65/601* (2013.01); *H04L 69/14* (2013.01); *H04Q 9/00* (2013.01); *H04B 3/60* (2013.01); *H04Q 2209/40* (2013.01)

(58) Field of Classification Search
CPC ...... H04L 63/00; H04Q 9/00; H04Q 2209/40; H04B 7/18595; H04B 3/60; H04B 7/18517; H04B 7/185
USPC ........................................................ 455/12.1
See application file for complete search history.

(56) References Cited

U.S. PATENT DOCUMENTS

| | | | |
|---|---|---|---|
| 8,560,096 | B1 | 10/2013 | Chapman et al. |
| 8,588,129 | B2 | 11/2013 | Madsen et al. |
| 9,074,468 | B1 | 7/2015 | Selman et al. |
| 2004/0257264 | A1 | 12/2004 | Moeller-Jensen |
| 2010/0157736 | A1* | 6/2010 | Riordan ................. G01S 15/87 367/88 |
| 2012/0307720 | A1 | 12/2012 | Madsen et al. |
| 2013/0187787 | A1 | 7/2013 | Damus et al. |
| 2014/0237365 | A1* | 8/2014 | Oberbrunner ........ H04N 21/234 715/722 |
| 2016/0006500 | A1 | 1/2016 | Radpour |
| 2016/0063768 | A1 | 3/2016 | Parente Da Silva |

FOREIGN PATENT DOCUMENTS

| | | |
|---|---|---|
| GB | 2 452 951 | 3/2009 |
| KR | 2012-0086250 | 8/2012 |

* cited by examiner

PERFORMING REMOTE INSPECTION AT SUBSEA LOCATIONS

This invention relates to methods and systems for performing subsea tasks, such as real-time remote inspection at subsea locations.

The subsea oil and gas industry requires inspections or surveys to be performed frequently at subsea locations, for example on subsea structures such as pipelines.

When performing inspections underwater, especially beyond diver depth, inspection is typically performed remotely using an unmanned underwater vehicle such as an ROV (remotely-operated vehicle) as an inspection platform. An operator is located offshore at a surface location, for example aboard an ROV support vessel or on a surface installation such as a production platform. The operator may be an individual, known in the art as a Subject Matter Expert (SME) or may be a team comprising such SMEs or other personnel, including ROV pilots.

Data acquired by the ROV is conveyed to the operator by signals transmitted wirelessly through water or along a tether that connects the ROV to the vessel or installation at the surface. Similarly, control signals are returned from the operator to the ROV, either wirelessly or along the tether.

The operator views video monitors that present video signals and other data, usually in real time, and acts on that data accordingly. For example, as the ROV traverses a subsea structure, the operator may spot an anomaly such as a possible defect in the structure on a video feed from cameras on the ROV. In response, the operator may then command the ROV to hold station relative to the structure to investigate that anomaly in detail and possibly also to remedy it.

An ROV is just one example of a submersible vehicle that may be used for subsea inspections. Another example of a subsea inspection platform is an AUV (autonomous underwater vehicle). An AUV has the capability to follow a subsea route and to perform certain subsea tasks, such as inspection, without being tethered to a surface vessel or installation and without necessarily requiring real-time control from a surface-based operator. However, an AUV may also convey data to an operator, either wirelessly or through a wired data connection provided to a subsea AUV dock or garage.

More generally, a subsea inspection platform may be any UUV (unmanned underwater vehicle) or structure for underwater use carrying inspection equipment, such as cameras, sensors, sonars, etc.

Subsea tasks such as remote inspections may have to be performed in deep water, hundreds of kilometres from the nearest land and hence over the horizon. This presents challenges of how to transmit data relating to the subsea task from an offshore vessel or surface installation to an onshore station in the absence of a proprietary data-transmission network. There are also challenges in how to interpret and act on that data in a timely manner.

Even if land is nearby, potentially allowing line-of-sight communication from ship to shore, there may be no data-transmission infrastructure in undeveloped onshore areas. Consequently, only satellite transmission of data may be available, which means that the bandwidth available for data transmission is too low to handle the high rate at which data is streamed from the point of inspection.

Various communications systems utilising one or more satellites are described in U.S. Pat. Nos. 8,588,129, 5,793, 813 and US 2016/006500.

The low bandwidth available for long-distance data transmission makes it necessary to locate an SME offshore because the data transmission rate is too low for real-time remote inspection with sufficient resolution. Consequently, outputs have to be analysed offshore because analysis onshore would only be possible after a substantial and impractical delay.

In this respect, recent improvements in inspection techniques generate data outputs or data streams that can be extremely bulky. Low-bandwidth communication means such as satellite transmission systems cannot transfer such data streams onshore in real-time or with an acceptable delay. For example, 3D imaging techniques involving high-definition 3D cameras require bandwidth that is even greater than is achievable by standard ROV tethers. Such imagery is absolutely not transferable by satellite transmission in real time.

Another example is mosaicking, where a 3D image or model is built from the acquisition of 2D or 3D images or sonar signals. Here again, no real time transfer of processed data can be envisaged, even if real-time mosaicking is now possible. For example, KR 101180260 describes mosaicking of seafloor images and transfer from an underwater vehicle to a surface vessel. US 2016/063768 describes a system and method for remotely-operated vehicles with superimposed 3D imagery; however, no transmission of the generated images to an onshore location is discussed.

Traditionally, therefore, where subsea inspections are carried out by surface-based or underwater vehicles located offshore, the inspection data is processed and reviewed by an SME located close to the point of data acquisition i.e. on a vessel or installation at the surface above the inspection location.

This approach has various drawbacks. It is considerably more expensive to site SMEs offshore than onshore and it exposes them to the safety risks that are inherent in offshore working. Even then, an offshore SME may not have the competencies required to detect or analyse all flaws that could be revealed by an inspection. Also, there could be doubt as to the correct analysis and approach, or an offshore SME may not have the authority to decide autonomously on a plan of action.

Consequently, an offshore SME will routinely send data onshore for double-checking by competent personnel based on land. However, the low bandwidth available for long-distance data transmission will cause a delay between the inspection operation and taking and executing consequential decisions. Such a delay is likely to require the ROV to dive again to perform additional inspections or remedial work, which wastes time and money.

In some prior art systems involving offshore-to-onshore data transmission, the data stream is intrinsically compact enough to be transferred onshore in real time. Such prior art is of merely background relevance to the present invention. For example, EP 2919182 describes a system for risk management of marine mooring systems, in which data is transferred onshore to an administrative server that processes the data for comparison with standards and guidelines for raising an alarm.

U.S. Pat. No. 8,560,096 describes a remote offshore monitoring system comprising onsite data processing and storage and a remote administrative system.

EP 0737321 uses multiple satellites in parallel to achieve real-time monitoring of the position of icebergs and marine traffic and transfer of information regarding potential collisions.

U.S. Pat. No. 7,009,550 relates to an oil spill identification system comprising sensor units that collect and transmit data to an onshore control station for analysis, although the data transfer methods used require the two entities to be in close physical proximity.

U.S. Pat. No. 9,074,468 describes a method of providing real-time streaming of drilling data transmission services using self-aligning satellites, in which the data output may be provided at a low level as fixed-format ASCII data or at a high level (for example, as a self-defining customisable data stream). Of course, ASCII data is not relevant to image processing.

Against this background, the invention resides in a method of performing remote subsea inspection. The method comprises: receiving mission data acquired by a subsea inspection platform; processing the mission data at an offshore location automatically and substantially in real time to produce a low-resolution output and a high-resolution output; storing the high-resolution output at the offshore location; and transmitting the low-resolution output wirelessly across a communication link between the offshore location and an onshore or inshore location automatically and substantially in real time. The low-resolution output may also be stored at the offshore location before its transmission across the communication link to the onshore or inshore location.

Preferably, the method comprises: measuring available bandwidth of the communication link; and transmitting the low-resolution output across the communication link from the offshore location to the onshore or inshore location at a resolution adjusted automatically in accordance with the available bandwidth of the communication link. For example, the mission data may be processed to produce the low-resolution output at a resolution adjusted in accordance with the available bandwidth of the communication link. Another approach is to retrieve the low-resolution output from storage at the offshore location at a transfer rate adjusted in accordance with the available bandwidth of the communication link.

The method may comprise, in response to a command received at the offshore location: retrieving a selected portion of the high-resolution output from storage at the offshore location; and transmitting that selected portion of the high-resolution output across the communication link to the onshore or inshore location. Again, the selected portion of the high-resolution output may be transmitted across the communication link at a resolution or transfer rate adjusted automatically in accordance with measured available bandwidth of the communication link.

Raw inspection data derived from the mission data may also be stored at the offshore location. In that case, the method may comprise, in response to a command received at the offshore location: retrieving a selected portion of the raw inspection data from storage at the offshore location; and transmitting that selected portion of the raw inspection data across the communication link to the onshore or inshore location.

While transmitting the selected portion of the high-resolution output or of the raw inspection data across the communication link, transmission of the low-resolution output across the communication link may be interrupted automatically. Alternatively, the resolution or transfer rate at which the low-resolution output is transmitted across the communication link may be reduced.

The command may be issued by an operator situated at the onshore or inshore location, or in data communication with that location via a terrestrial communication network, and is transmitted across the communication link to the offshore location. In some cases, the command may be issued by one of a team of such operators, similarly situated. However, the command may instead be issued by an operator situated at the offshore location.

The selected portion of the high-resolution output or of the raw inspection data is suitably defined in the command with reference to geographical or temporal parameters.

Preferably, control signals are transmitted across the communication link from the onshore or inshore location to the offshore location to control operation of, or to define subsequent operation of, the subsea inspection platform. Conversely, data/process quality reports or processing system parameters relating to the processing of mission data may be transmitted across the communication link from the offshore location to the onshore or inshore location.

The mission data may, for example, comprise a 3D sonar signal or a video signal. Processing of the mission data may include mosaicking.

The inventive concept embraces an offshore data processing system for processing mission data acquired during subsea inspection. The system comprises: an on-board controller; a software engine configured to process the mission data automatically and substantially in real time to produce a low-resolution output and a high-resolution output; an on-board memory for storing the high-resolution output; and a wireless communication link for transmitting the low-resolution output to an onshore or inshore location automatically and substantially in real time.

The system may further comprise a subsea inspection platform for acquiring the mission data. It is possible for the software engine and the memory to be implemented on board the subsea inspection platform and/or on board a surface vessel or platform.

The system of the invention preferably further comprises a bandwidth sensor for measuring available bandwidth on the communication link. In that case, the controller is responsive to the bandwidth sensor to adjust resolution of the low-resolution output automatically in accordance with the available bandwidth. The controller may, for example, act on the software engine to process the low-resolution output in accordance with the available bandwidth. Where the memory also stores the low-resolution output, the controller may act on the memory to retrieve the low-resolution output from storage at a transfer rate in accordance with the available bandwidth.

The controller is suitably responsive to external command to retrieve a selected portion of the high-resolution output from the memory and to transmit that selected portion of the high-resolution output across the communication link.

The memory may also store raw data derived from the mission data, in which case the controller is responsive to external command to retrieve a selected portion of the raw data from the memory and to transmit that selected portion of the raw data across the communication link.

The inventive concept extends to a marine communication system comprising the offshore data processing system of the invention situated at an offshore location and one or more subject-matter experts situated at an onshore or inshore location. The or each subject-matter expert receives the low-resolution output via the communication link substantially in real time and selectively receives a portion of the high-resolution output, or of raw data, in response to a command transmitted to the offshore location across the communication link. The communication link suitably comprises a satellite link.

In a preferred embodiment, the invention provides a method to perform remote inspection of subsea structures, which method comprises:

acquiring inspection data from an unmanned underwater vehicle or other subsea inspection platform;

processing the inspection data offshore to produce a high-definition output;

processing the inspection data offshore to produce a low-definition output whose definition is set to comply with a measured offshore-to-onshore system transmission rate;

storing, offshore, the low- and high-definition outputs and preferably also raw inspection data; and transmitting the low-definition output to an onshore station;

wherein processing and low-definition data transfer are done automatically and in real-time.

The high-definition output stored offshore may then be transmitted onshore on demand, for example in response to a request or command issued by the onshore station.

The invention may therefore be summarised as method of performing remote subsea inspection that comprises processing mission data, for example from an unmanned underwater vehicle, at an offshore location to produce a low-resolution output and a high-resolution output, automatically and in real time.

The high-resolution output is stored at the offshore location while the low-resolution output is transmitted wirelessly across a low-bandwidth communication link, also automatically and in real time, to be reviewed by SMEs at one or more onshore or inshore locations. Selected portions of the high-resolution output can be transmitted across the communication link to the SMEs on demand. Data outputs may be transmitted across the communication link at a resolution adjusted automatically in accordance with the bandwidth measured to be available on that link.

The basis of the invention, therefore, is to use a smart method of data transfer where limited-bandwidth communications links can be used to enable fast access to data, such as image data, relating to inspections carried out offshore. SMEs can then carry out interpretation or analysis of that data at locations remote to where the inspection was carried out, most conveniently onshore or inshore.

Using automated methods, 2D or 3D images are generated by processing sensor data at an offshore location. The sensor data may, for example, comprise camera imagery, side-scan sonar data or multibeam sonar data. Data acquisition and processing may take place on board a surface vessel or platform at the offshore location or on board a subsea inspection platform itself, such as an ROV.

Both high-resolution and low-resolution processed image data outputs are created by data processing software in accordance with the invention. The low-resolution image output, at least, may be defined by the bandwidth available on limited-bandwidth (e.g. satellite) communications links between the offshore location and onshore or inshore locations. All raw and processed image data is stored initially at the offshore site.

The system of the invention automatically transfers all low-resolution image data to an onshore or inshore station across limited-bandwidth communications links using standard data-transfer protocols. This provides SMEs located at the onshore or inshore station with near real-time access to these low-resolution images. The onshore or inshore station may also be connected via land-based internet links to allow remote access or display of the image data by SMEs at multiple locations with access to the internet.

SMEs located onshore, inshore or offshore may issue commands to the offshore system that will allow selected high-resolution processed images, or indeed raw data, to be sent onshore, based on defined temporal parameters and/or geographical location. The system can manage the queueing or transfer of data according to assigned priorities.

SMEs can use the available image data to identify anomalies and routine features within the inspection data. They may use the data as a basis for defining requirements for additional inspections and to plan additional missions that may need to be carried out remotely underwater.

In order that the invention may be more readily understood, reference will now be made, by way of example, to the accompanying drawings in which.

Figure 1:
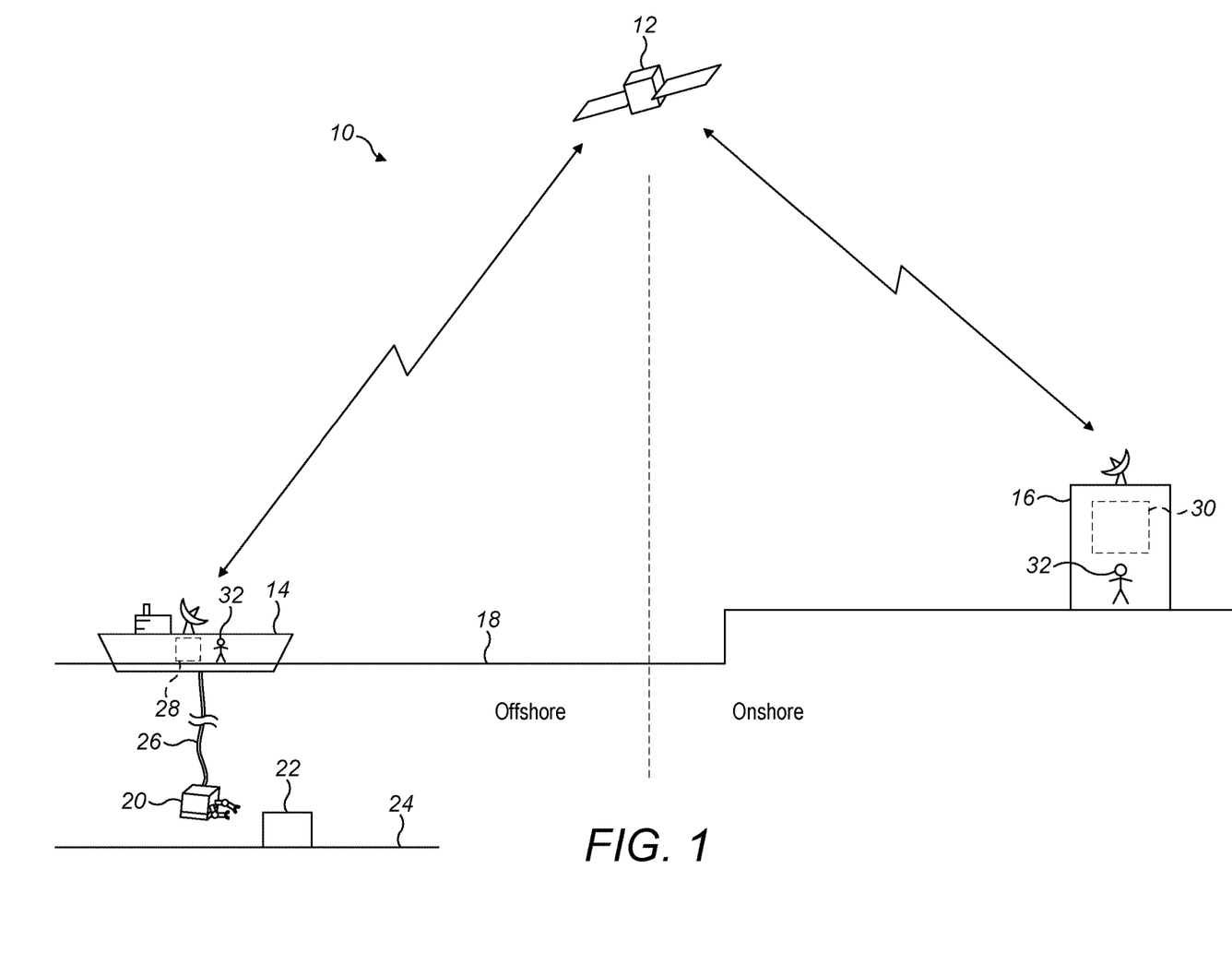
FIG. 1 is a schematic diagram of a satellite-based system for offshore data processing and for offshore-to-onshore data communication, in accordance with the invention.

FIG. 1 of the drawings shows a satellite-based system 10 for offshore data processing and for data communication between offshore and onshore locations. In this example, the system 10 provides for two-way low-bandwidth data transmission via a satellite 12 between an ROV support vessel 14 at the offshore location and a station 16 at the onshore location.

The ROV support vessel 14 floats on the surface 18 of the sea and supports an ROV 20, shown here performing a mission that involves inspecting a subsea structure 22 on the seabed 24. As is well understood, the ROV 20 may be equipped with cameras and sensors such as sonar sensors for this purpose, which equipment generates a stream of inspection data as the mission progresses.

A tether 26 provides for two-way high-bandwidth data communication between the ROV 20 and the ROV support vessel 14 during the mission. Specifically, the tether 26 conveys control data from the ROV support vessel 14 to the ROV 20. Conversely, the tether 26 conveys a stream of mission data, including inspection data, from the ROV 20 to the ROV support vessel 14.

The ROV support vessel 14 hosts an offshore data storage and processing system 28 that receives, stores and processes the mission data ready for transmission of selected data from the ROV support vessel 14 to the onshore station 16 via the satellite 12. The offshore system 28 is also responsive to control inputs received by the ROV support vessel 14 from the onshore station 16 via the satellite 12.

Similarly, the onshore station 16 hosts an onshore data storage and processing system 30 that stores and processes data received via the satellite 12 from the ROV support vessel 14 as shown. The onshore system 30 also produces control outputs that serve as the aforementioned control inputs to the offshore system 28.

One or more Subject Matter Experts (SMEs) 32 are located at the onshore station 16 to interact with the onshore system 30. Typically, such SMEs 32 will: review quality reports and outputs from the offshore system 28; identify a need for, and instigate data requests from, the offshore system 28; define coverage, for example by identifying boundaries for additional survey requirements; and set processing system parameters for use by the offshore system 28.

As will be explained below with reference to FIG. 2c, the onshore station 16 may represent more than one onshore location. Using the Internet or other high-bandwidth communication links, data delivery and decision-making may be distributed across a group of separately-located SMEs 32. Such SMEs 32 could, in principle, be located anywhere in the world that is served by suitable communication links.

Optionally, however, one or more other SMEs 32 may be located on board the ROV support vessel 14 to interact with the offshore system 28. Typically, such SMEs 32 will: review quality reports and outputs from the offshore system 28; define coverage, for example by identifying boundaries for additional survey requirements; and set processing system parameters for use by the offshore system 28.

In principle, the invention allows SMEs 32 to be located only onshore. Alternatively, the invention allows for fewer SMEs 32 or for less qualified and experienced SMEs 32 to be located offshore than would otherwise be required. Both of the latter possibilities are enabled by the support of real-time input from highly-capable SMEs 32 based onshore.

Figure 2A:
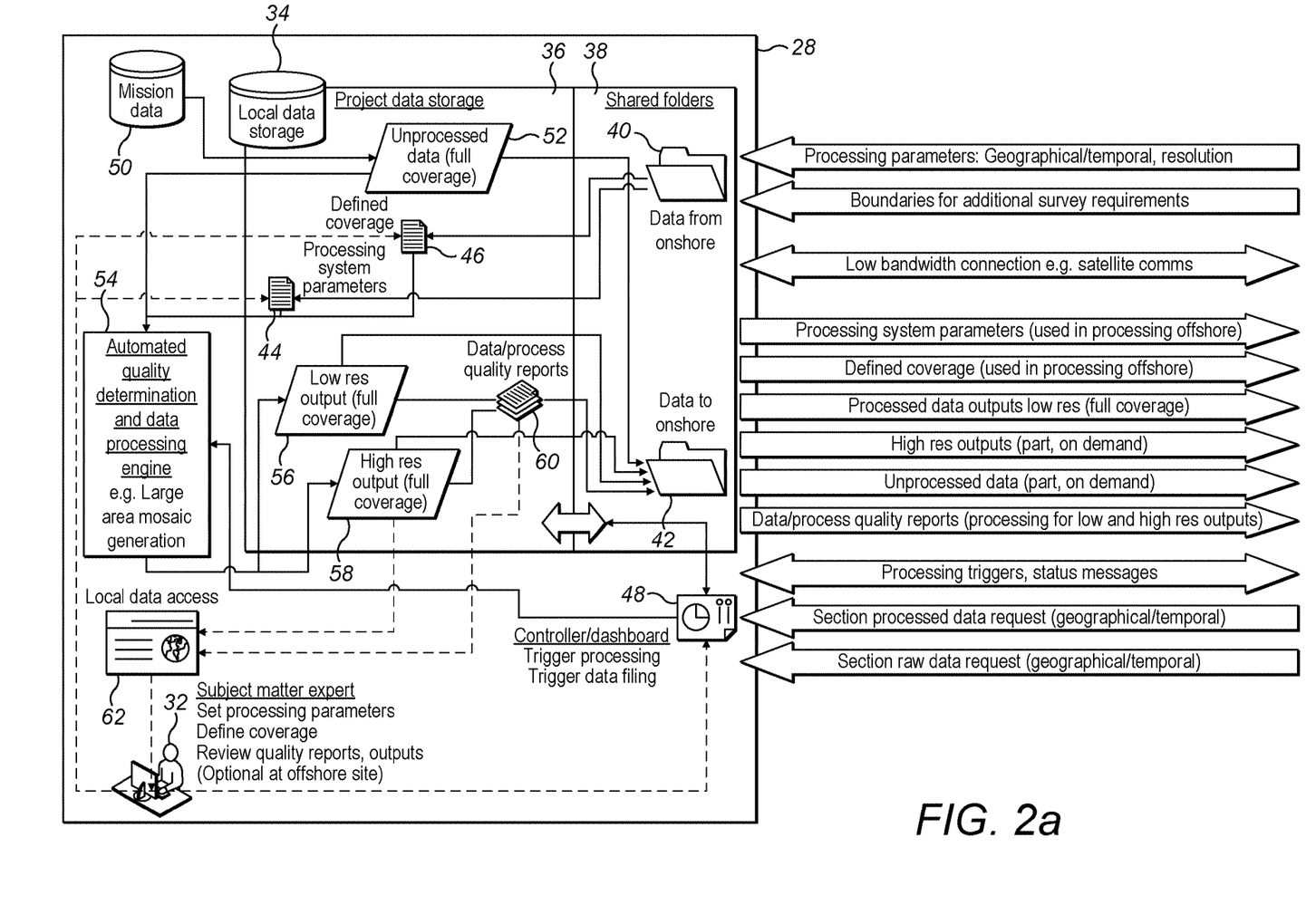
FIG. 2a is a diagram of an offshore data storage and processing system, representing offshore data flow and access in the system of FIG. 1.

Turning now to FIG. 2a, this shows the offshore data storage and processing system 28 in detail. The system 28 comprises local data storage 34 that is partitioned into a project data storage space 36 and a shared folder space 38.

The shared folder space 38 provides for data transmitted to and from the corresponding onshore data storage and processing system 30 of the onshore station 16. Thus, the shared folder space 38 contains a data-in folder 40 for input data received from the onshore station 16 and a data-out folder 42 for output data to be sent to the onshore station 16 via the satellite 12.

The data-in folder 40 may, for example, receive control data from the onshore station 16 pertaining to processing parameters such as resolution or geographical or temporal parameters. The control data may also prescribe boundaries for defining additional survey requirements and other inspection coverage.

Data relating to processing system parameters 44 and defined coverage 46 is transferred from the data-in folder 40 to be held in the project data storage space 36. If an SME 32 is stationed offshore on board the ROV support vessel 14 shown in FIG. 1, that SME 32 can modify the processing system parameter data 44 and defined coverage data 46.

The data-out folder 42 contains core output data that comprises processed, low-resolution data outputs, providing full coverage of the mission objective to the onshore station 16. Such low-resolution data outputs may be transmitted continuously in real time via the satellite 12 to the onshore system 30 of the onshore station 16 during a mission. The core output data may further comprise high-resolution data outputs and/or raw unprocessed data outputs providing partial coverage of the mission objective. Such high-resolution data outputs are transmitted via the satellite 12 to the onshore system 30 selectively, on demand.

Where the data outputs have been processed, the data-out folder 42 may also contain data/process quality reports relating to the processing involved in producing both low- and high-resolution data outputs. The data-out folder 42 may also contain other output data such as processing system parameters or defined coverage, as used in processing offshore.

A controller 48 responds to commands received from the onshore station 16, as may be issued by SMEs 32 at the onshore station 16, to control the offshore data storage and processing system 28. If an SME 32 is stationed offshore on board the ROV support vessel 14 shown in FIG. 1, that SME 32 can also issue commands to the controller 48.

For example, the controller 48 may receive requests from SMEs 32 for specific sections of high-resolution data outputs and/or raw unprocessed data outputs, defined with reference to geographical and/or temporal parameters. Such parameters may be expressed as one or more particular locations of the ROV 20 or points in time during the mission. Thus, the controller 48 manages data transfers between the project data storage space 36 and the shared folder space 38 of the local data storage 34. The controller 48 may, for example, receive commands and provide feedback to an SME 32 via a dashboard graphical interface.

The controller 48 also triggers data processing and data filing in response to trigger signals received from the onshore station 16. The controller 48 may also send status messages or signals to the onshore station 16.

During a mission undertaken by the ROV 20 shown in FIG. 1, mission data 50 including inspection data is received from the ROV 20 and stored in the project data storage space 36 as raw unprocessed data 52. That raw data 52 provides full coverage of the images, sonar scans or other inspection results produced by the mission.

As noted above, the controller 48 may be commanded to select appropriate parts of the raw data 52 and to output those parts to the offshore station 16 via the data-out folder 42.

The raw data 52 is also provided to an automated quality determination and data processing engine 54. That engine 54 is controlled by the controller 48 and takes further control inputs from the processing system parameter data 44 and defined coverage data 46 held in the project data storage space 36.

The engine 54 processes the raw data 52 in accordance with its various control inputs, for example by large area mosaic generation. The engine 54 thereby produces a low-resolution output 56 and a high-resolution output 58, both of which are also stored in the project data storage space 36. The processed low-resolution and high-resolution outputs 56, 58 provide substantially full coverage of the inspection results produced by the mission, at their respective resolutions.

The engine 54 also produces data/process quality report data 60, which is also stored in the project data storage space 36 to be output to the offshore station 16 via the data-out folder 42.

If an SME 32 is stationed offshore on board the ROV support vessel 14 shown in FIG. 1, that SME 32 can have local data access at 62 to the processed high-resolution output 58 and the related data/process quality report data 60.

Figure 2B:
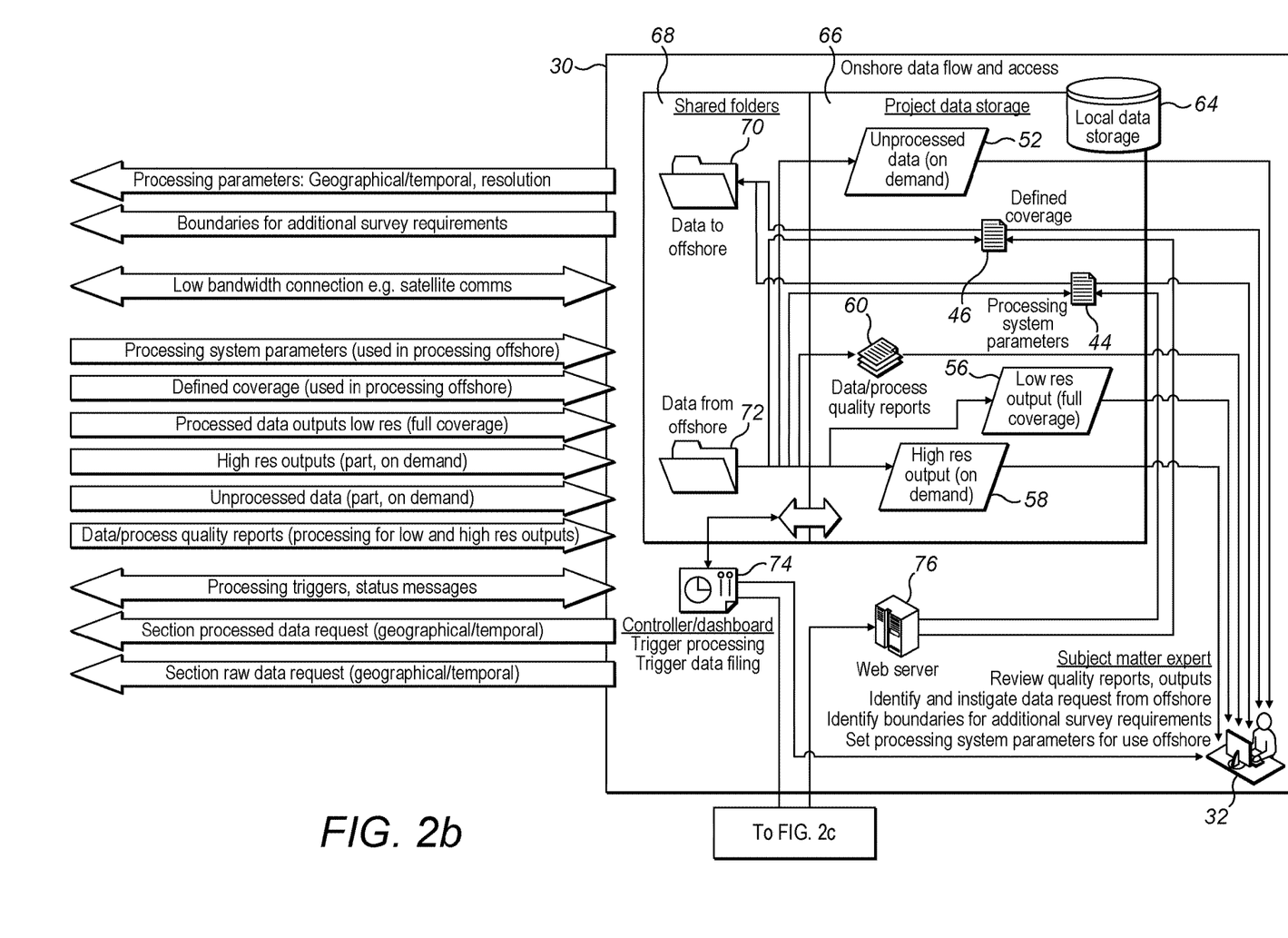
FIG. 2b is a diagram of an onshore data storage and processing system, representing onshore data flow and access in the system of FIG. 1.

Turning next to FIG. 2b, this shows the onshore data storage and processing system 30 in detail. Like the offshore system 28 of the ROV support vessel 14, the onshore system 30 comprises local data storage 64 that is partitioned into a project data storage space 66 and a shared folder space 68.

The shared folder space 68 provides for data transmitted to and from the corresponding offshore system 28. Thus, the shared folder space 68 contains a data-out folder 70 for output data to be sent to the offshore system 28 via the satellite 12 and a data-in folder 72 for input data received from the offshore system 28 via the satellite 12.

The data-out folder 70 may, for example, contain control data for transfer to the offshore system 28, that data pertaining to processing parameters such as resolution or geographical or temporal parameters. The control data may also prescribe boundaries for defining coverage and any additional survey requirements. The processing system parameter data 44 and the defined coverage data 46 are stored in the project data storage space 66, ready for transfer to the data-out folder 70.

The data-in folder 72 receives core output data from the offshore system 28. The core output data comprises a processed, low-resolution data output 56, providing full coverage of the mission objective. As noted previously, the core output data may further comprise a high-resolution data output 58 and/or a raw unprocessed data output 52 providing partial coverage of the mission objective, which are output from the offshore system 28 to the onshore station 16 selectively, on demand.

The low-resolution data output 56, the high-resolution data output 58 and the raw unprocessed data output 52 are transferred from the data-in folder 72 to be held in the project data storage space 66.

The data-in folder 72 may also receive: data/process quality report data 60 relating to the processing undertaken by the quality determination and data processing engine 54 of the offshore system 28 in producing the low- and high-resolution data outputs 56, 58; and other output data, such as processing system parameter data 44 or defined coverage data 46, as was used in processing by the offshore system 28.

The data/process quality report data 60, the processing system parameter data 44 and the defined coverage data 46 are transferred from the data-in folder 72 to be held in the project data storage space 66.

A controller 74 responds to commands received from SMEs 32 at the onshore station 16. The controller 74 may receive commands and provide feedback to an SME 32 via a dashboard graphical interface.

The controller 74 manages data transfers between the project data storage space 66 and the shared folder space 68 of the local data storage 64. In particular, the controller 74 transfers the processing system parameter data 44 and the defined coverage data 46 into the data-out folder 72 for transmission via the satellite 12 to the offshore system 28.

In addition to controlling the onshore system 30, the controller 74 controls the offshore system 28 by issuing requests to the controller 48 of the offshore system 28. Such requests may be for specific sections of high-resolution data outputs 58 and/or raw unprocessed data outputs 52, defined with reference to geographical and/or temporal parameters. The controller 74 and the controller 48 also send and receive trigger signals and status messages or signals to and from each other.

As noted above, data delivery and decision-making may be distributed across a group of separately-located SMEs 32. For this purpose, the onshore system 30 comprises a web server 76 that communicates with one or more web access modules 78 via a communications network such as the Internet 80, as shown in FIG. 2c. The or each web access module 78 also communicates via the Internet 80 with the controller 74.

Figure 2C:
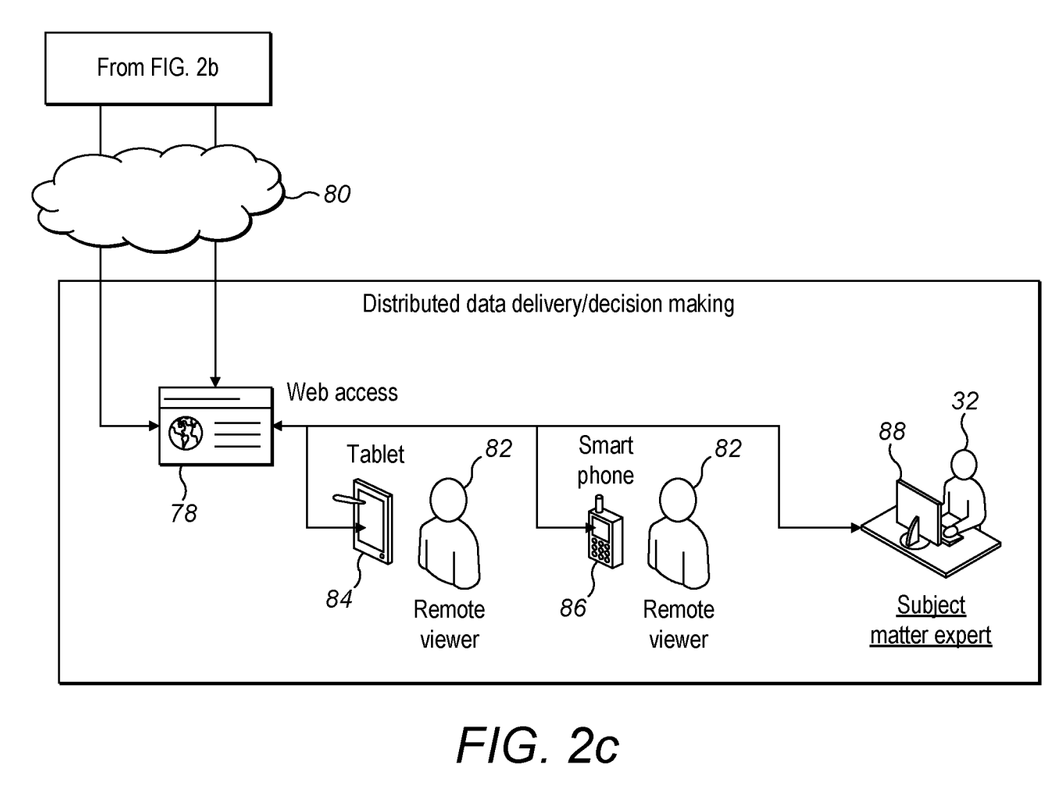
FIG. 2c is an extension of the diagram shown in FIG. 2b, illustrating how the onshore data storage and processing system can support distributed data delivery and decision-making.

The web access module 78 shown in FIG. 2c communicates in turn with remote viewers 82, who may use tablets 84, smartphones 86 or other web access devices to interact with the onshore system 30 via the web server 76. The web access module 78 also communicates with one or more remote SMEs 32, who may use a computer 88 as a web access device to interact with the onshore system 30 via the web server 76.

Thus, remote viewers 82 and remote SMEs 32 can send commands and requests via the web access module 78 to the controller 74, and from there to the controller 48 of the offshore system 28. By sending data via the web access module 78 and the web server 76, remote viewers 82 and remote SMEs 32 can also update the processing system parameter data 44 and the defined coverage data 46 held in the project data storage space 66 of the onshore system 30.

Figure 3:
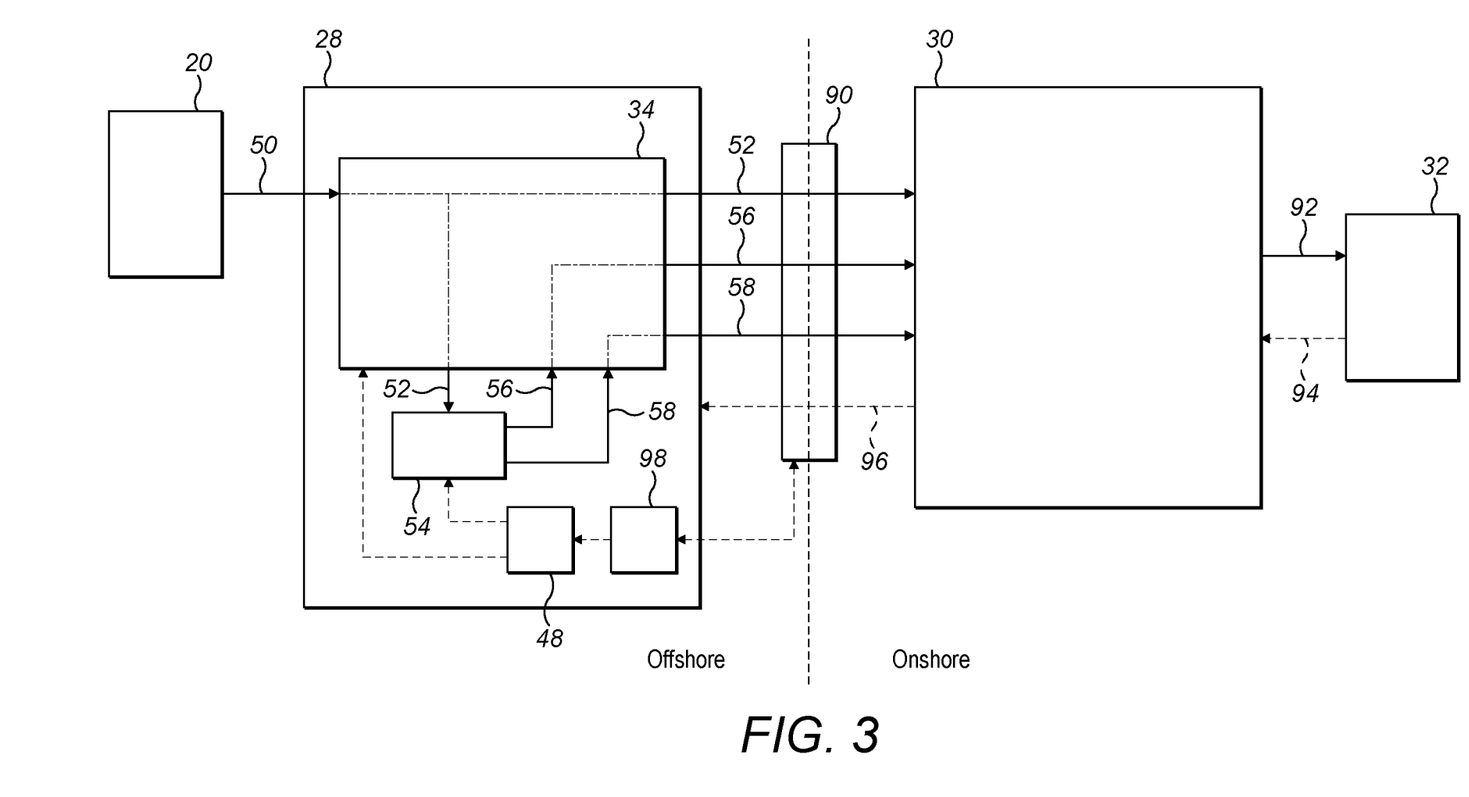
FIG. 3 is a simplified diagram of the system shown in outline in FIG. 1 and in detail in FIGS. 2a to 2c.

By way of summary, FIG. 3 simplifies the system 10 that is shown in outline in FIG. 1 and in detail in FIGS. 2a, 2b and 2c. Like numerals are used for like parts. To simplify presentation, some of the aforementioned preferred but optional data streams are omitted from FIG. 3, such as data/process quality reports, processing system parameters, defined coverage, trigger signals and status messages.

Thus, FIG. 3 shows an offshore system 28 interacting with an onshore system 30 via a low-bandwidth communication link 90, for example via the satellite 12 of FIG. 1. The onshore system 30, at least, interacts in turn with at least one SME 32 or other operator. Specifically, the SME 32 receives information 92 from the onshore system 30 and responds with control inputs 94 to the onshore system 30. Those control inputs 94 may, for example, be requests for specific sections of high-resolution data outputs 58 and/or raw unprocessed data outputs 52, defined with reference to geographical and/or temporal parameters. The onshore system 30, in turn, transmits corresponding control inputs 96 to the offshore system 28 via the satellite 12 of FIG. 1.

FIG. 3 shows that mission data 50 from the ROV 20 is received into the local data storage 34 of the offshore system 28 as raw data 52. In addition to being stored in the local data storage 34, the raw data 52 is processed in the automated quality determination and data processing engine 54 to produce a low-resolution output 56 and a high-resolution output 58. Those outputs 56, 58 may also be stored in the local data storage 34 before onward transmission to the onshore system 30 via the satellite 12 of FIG. 1.

The low-resolution output 56 is transmitted to the onshore system 30 substantially continuously and in real time at a rate adapted to suit the available bandwidth of the satellite connection. For this purpose, the controller 48 of the offshore system 28 acting on the engine 54 receives control input from a bandwidth sensor 98 that detects and monitors the bandwidth available for data transfer via the communication link 90. The controller 48 instructs the engine 54 to adjust or tailor the data output rate of the low-resolution output 56 accordingly.

It is not essential that the low-resolution output 56 is stored in the local data storage 34 before its onward transmission to the onshore system 30. By controlling the engine 54 in accordance with the available bandwidth of the communication link 90 as determined by the bandwidth sensor 98, it would be possible instead for the low-resolution output 56 to be transmitted directly from the engine 54 across the communication link 90 to the onshore system 30.

Conversely, if the low-resolution output 56 is stored in the local data storage 34, it would be possible for the controller 48 to adjust or tailor the transfer rate at which the local data storage 34 retrieves and outputs the low-resolution output 56 for transmission across the communication link 90. This may involve some additional processing of the stored low-resolution output 56, which processing is apt to be performed by the engine 54. Again, such processing will be in accordance with the available bandwidth of the communication link 90 as determined by the bandwidth sensor 98.

Appropriate portions of the raw data 52 and/or the high-resolution output 58 can be transmitted to the onshore system 30 on demand. The low-resolution output 56 may then be interrupted or reduced in resolution or transfer rate to maximise the bandwidth of the satellite connection that is available to carry the raw data 52 and/or the high-resolution output 58.

It would be possible also to tailor the resolution or transfer rate of the high-resolution output 58 to suit the available bandwidth of the communication link 90 as determined by the bandwidth sensor 98. Again, this may involve some additional processing of the stored high-resolution output 58, which processing is apt to be performed by the engine 54.

Other variations are possible within the inventive concept. For example, at least some processing or storage of mission data 50 may take place on board the ROV 20. Also, an ROV is merely an example of a subsea inspection platform that could be used for the purposes of the invention. Another example of a subsea inspection platform is an AUV or other underwater vehicle, which is typically unmanned, or a buoyant frame that is suspended from or towed by a surface support vessel. Thus, a subsea inspection platform need not be self-propelled.

In principle, some locations at sea may be close enough to shore to be connected by high-bandwidth data connections to land-based communications networks, such as the internet. Thus, the invention may have benefit not just between offshore and onshore locations but also between offshore and inshore locations.

For the purposes of this specification, the distinction between offshore and inshore locations is that the latter may be connected to land-based communications networks by data connections of high enough bandwidth to avoid the data-transmission problems addressed by the invention. In contrast, such data-transmission problems are suffered at an offshore location that cannot be connected to land-based communications networks by data connections of sufficiently high bandwidth. This may be because such connections cannot be made at over-the-horizon distance or to a mobile platform such as a surface vessel.

Put another way, a surface vessel or static platform at an inshore location could be regarded as substantially equivalent to an onshore installation in a broad sense of the invention, if that inshore location is close enough to land to be connected to a land-based communications network by a high-bandwidth data connection. Such a data connection could be effected by a wired connection to a fixed installation, e.g. a fibre optic cable, or by a line-of-sight wireless connection to a fixed or mobile platform.

The invention claimed is:

1. A method of performing remote subsea inspection of subsea structures, the method comprising:
   receiving mission data acquired by a subsea inspection platform;
   processing the mission data at an offshore location automatically and substantially in real time during a mission to produce a low-resolution image data output and a high-resolution image data output;
   storing the high-resolution image data output at the offshore location; and
   transmitting the low-resolution image data output wirelessly across a communication link provided at least partially through water between the offshore location and an onshore or inshore location automatically and substantially continuously in real time during the mission;
   the method further comprising:
   measuring available bandwidth of the communication link; and
   transmitting the low-resolution output across the communication link from the offshore location to the onshore or inshore location at a resolution adjusted automatically in accordance with the available bandwidth of the communication link;
   wherein the mission data is processed to produce the low-resolution output at a resolution adjusted in accordance with the available bandwidth of the communication link.

2. The method of claim 1, wherein the low-resolution output is retrieved from storage at the offshore location at a transfer rate adjusted in accordance with the available bandwidth of the communication link.

3. The method of claim 1, comprising storing the low-resolution output at the offshore location before its transmission across the communication link to the onshore or inshore location.

4. The method of claim 1, comprising, in response to a command received at the offshore location:
   retrieving a selected portion of the high-resolution output from storage at the offshore location; and
   transmitting that selected portion of the high-resolution output across the communication link to the onshore or inshore location.

5. The method of claim 4, comprising transmitting the selected portion of the high-resolution output across the communication link at a resolution or transfer rate adjusted automatically in accordance with measured available bandwidth of the communication link.

6. The method of claim 4, comprising, while transmitting the selected portion of the high-resolution output or of the raw inspection data across the communication link, automatically interrupting transmission of the low-resolution output across the communication link, or reducing the resolution or transfer rate at which the low-resolution output is transmitted across the communication link.

7. The method of claim 4, wherein the command is issued by an operator situated at the onshore or inshore location, or in data communication with that location via a terrestrial communication network, and is transmitted across the communication link to the offshore location.

8. The method of claim 7, wherein the command is issued by one of a team of operators situated at the onshore or inshore location or in data communication with that location via a terrestrial communication network.

9. The method of claim 4, wherein the command is issued by an operator situated at the offshore location.

10. The method of claim 4, wherein the selected portion of the high-resolution output or of the raw inspection data is defined in the command with reference to geographical or temporal parameters.

11. The method of claim 1, further comprising storing at the offshore location raw inspection data derived from the mission data.

12. The method of claim 11, comprising, in response to a command received at the offshore location:
    retrieving a selected portion of the raw inspection data from storage at the offshore location; and
    transmitting that selected portion of the raw inspection data across the communication link to the onshore or inshore location.

13. The method of claim 1, comprising transmitting control signals across the communication link from the onshore or inshore location to the offshore location to control operation of, or to define subsequent operation of, the subsea inspection platform.

14. The method of claim 1, comprising transmitting across the communication link from the offshore location to the onshore or inshore location data/process quality reports or processing system parameters relating to the processing of mission data.

15. The method of claim 1, wherein the mission data comprises a 3D sonar signal.

16. The method of claim 1, wherein the mission data comprises a video signal.

17. The method of claim 1, wherein processing of the mission data includes mosaicking.

18. An offshore data processing system for processing mission data acquired during subsea inspection of subsea structures, the system comprising:
 an on-board controller;
 a software engine configured to process the mission data automatically and substantially in real time during a mission to produce a low-resolution image data output and a high-resolution image data output;
 an on-board memory for storing the high-resolution image data output;
 a wireless communication link provided at least partially through water for transmitting the low-resolution image data output to an onshore or inshore location automatically and substantially continuously in real time during the mission; and
 a bandwidth sensor for measuring available bandwidth on the communication link;
 wherein the controller is responsive to the bandwidth sensor to adjust resolution of the low-resolution output automatically in accordance with the available bandwidth; and
 wherein the controller acts on the software engine to process the low-resolution output in accordance with the available bandwidth.

19. The system of claim 18, further comprising a subsea inspection platform for acquiring the mission data.

20. The system of claim 19, wherein the software engine and the memory are implemented on board the subsea inspection platform.

21. The system of claim 18, wherein the software engine and the memory are implemented on board a surface vessel or platform.

22. The system of claim 18, wherein the memory also stores the low-resolution output and the controller acts on the memory to retrieve the low-resolution output from storage at a transfer rate in accordance with the available bandwidth.

23. The system of claim 18, wherein the controller is responsive to external command to retrieve a selected portion of the high-resolution output from the memory and to transmit that selected portion of the high-resolution output across the communication link.

24. The system of claim 18, wherein the memory also stores raw data derived from the mission data and the controller is responsive to external command to retrieve a selected portion of the raw data from the memory and to transmit that selected portion of the raw data across the communication link.

25. A marine communication system comprising the offshore data processing system of claim 18 situated at an offshore location and one or more subject-matter experts situated at an onshore or inshore location, the or each subject-matter expert receiving the low-resolution output via the communication link substantially in real time and selectively receiving a portion of the high-resolution output, or of raw data, in response to a command transmitted to the offshore location across the communication link.

26. The system of claim 25, wherein the communication link comprises a satellite link.

* * * * *